United States Patent Office 2,992,114
Patented July 11, 1961

2,992,114
PRESERVATION PROCESS
Elmer A. Weaver, Spring Mount, Pa., assignor to the United States of America as represented by the Secretary of Agriculture
No Drawing. Filed Dec. 18, 1957, Ser. No. 703,711
10 Claims. (Cl. 99—154)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for prolonged preservation of fruits, fruit products, vegetables and vegetable products an enzymes. In particular this invention relates to preservation at temperatures in the range of 40° F. to room temperature of the original fresh flavor and characteristics of products such as apple cider (freshly pressed apple juice), fruit juices; fruit salads; fruits, for example, sliced peaches, sliced bananas, whole strawberries; and also enzymes. This process is applicable to vegetables and vegetable products such as onions, tomatoes, carrot juice and celery juice by a method comprising a combination of adding a preservative such as sorbic acid (or its salts) or l-ascorbic acid to the product plus a selected heat treatment of the proper temperature and exposure time designated so as to prevent heat damage in the product but sufficient to implement the preservation process. These temperatures will usually be at or below 120° F. and will usually be no lower than 100° F. The exposure times may range from one to five minutes at 120° F. and five to thirty minutes at 100° F. Adjustments in time and temperature will become obvious in the processing of the preferred material.

An object of this invention is to provide a method whereby fruits and fruit products, vegetables and vegetable products and enzymes can be preserved without need of freezing temperatures or the application of pasteurizing or sterilizing treatments. This inventive preservation process is effective for considerable periods of time with retention of the characteristics of freshly prepared products.

A further object of the invention is to minimize the quantity of preservative needed to effect preservation. This has been accomplished in the use of the invention as illustrated with sodium sorbate, where materials not receiving the low heat treatment in conjunction with the sodium sorbate spoiled in the presence of concentrations of sodium sorbate four times that which gave adequate preservation when used as described in the process of the invention.

Another object of the invention is to provide a means of preservation so that the stored product is superior in quality and flavor to that obtainable by any heretofore reported process which is followed by storage of the product at temperatures above freezing.

A further object of this invention is to provide processors with a means of preserving various products for considerable periods of time at room temperatures, (usually in the range of 70 to 75° F.) or for extending the storage periods at cold room temperatures (50° F. or lower). Associated with this objective is the elimination of the requirement of costly processing equipment necessary for canning, pasteurizing, sterilizing, freezing and the like.

Another object in the use of this invention is to make it possible to stabilize and preserve materials which are heat or cold sensitive and thus not satisfactory when preserved by conventional means, i.e. materials like bananas which become soft when heated above 120° F. and which cannot be frozen because of loss in texture and other natural characteristics, or the loss of potency of enzymes when heated to pasteurizing or sterilizing temperatures.

It was discovered that the addition of sodium sorbate, potassium sorbate or sorbic acid at levels in the range of 0.025 to 0.10% by weight plus a heat treatment, which is a combination of time and temperature insufficient per se to preserve, has the unique effect of preventing or suppressing microbial spoilage for time intervals in excess of 90 days at room temperature while at the same time preserving the characteristics of freshly prepared products. A particular advantage in the use of sodium sorbate as a chemical preservative, is the absence of any detectable taste or off-flavor due to its presence in the treated product. Its use is not to be construed as prohibitive over other preservatives having similar properties. The relatively low temperatures and exposure times of the heat treatment cause no significant differences in the flavor, texture and characteristics of the heated product from those it possessed prior to heating. With the use of this inventive process it was possible to maintain enzyme potency in a tomato pectase preparation over an extended period of time without encountering microbial spoilage.

Described processes are given in this invention for the preservation of fresh fruits, fruit products, and enzymes, such as, apple cider, fruit salad, bananas, peaches, strawberries and tomato pectase enzymes. This is accomplished by adding sodium sorbate, potassium sorbate, or sorbic acid at levels in the range of 0.025 to 0.10% by weight, and l-ascorbic acid in concentrations of about 0.015% by weight. The product is packed in clean containers such as glass bottles, followed by a heat treatment which is a combination of time and temperature insufficient per se for preservation, preferably heating to a temperature in the range of 100 to 120° F. for a time interval of five to fifteen minutes and cooling to room temperature. Alternatively the product can be packaged following the heat treatment.

In determining the preservative effects of variations in the inventive process as applied to different products, the stored products were evaluated as to microbial counts and as to retention of flavor and other natural characteristics of freshly prepared products. The number of yeasts and molds was determined by a standard serial dilution technique employing wort agar as the culturing medium. Bacterial counts were determined by similar procedures employing nutrient agar as the culturing medium. Plate counts were made after incubation of the plates for three days at a temperature of 86° F.

Organoleptic tests were conducted by an experienced taste panel. Samples were designated as spoiled on the basis of unsightly appearance or off-flavor.

The practice of this invention is further illustrated by typical examples of its application to food products and enzyme preparations as given below.

EXAMPLE 1

Twenty-four hour old apple cider held at 40° F. was obtained from a commercially produced source and apportioned for treatment as summarized in Table I. One aliquot was retained untreated to serve as a control. A twenty-five percent aqueous sodium sorbate solution was used to give concentrations of 0.025%, 0.05% and 0.10% by weight in three separate portions of this apple cider. Cleaned and pasteurized pint bottles were filled, five replicates for each of the different processes, and capped. Bottles containing 0.025% sodium sorbate were arranged into two groups. One group was heated at 120° F. for five minutes, cooled, to room temperature and labeled. The other group containing 0.025% sodium sorbate was heated to 130° F. for five minutes, cooled to room temperature and labeled. The same procedure was followed for two groups of bottles containing 0.05% sodium sorbate. Control bottles were arranged into three groups. One group received no treatment, one was heated at 120° F. and the other at 130° F. respectively for five minutes. Bottles containing 0.10% sodium sorbate were not heated. All bottles were stored at room temperature. Aseptic techniques were used in making microbial counts. Results are presented in Table I, where each value represents the average of five determinations for each treatment. No counts were obtained for the control bottles after 14 days storage.

*Table I*

EFFECT OF SODIUM SORBATE AND MILD HEAT TREATMENT UPON VIABLE MICROBIAL CONTENT OF APPLE CIDER STORED AT ROOM TEMPERATURE FOR TWO MONTHS

| Lot No. | Treatment of Cider | | Microbial Count per ml. | |
|---|---|---|---|---|
| | Sodium Sorbate, percent | Heat Treatment | Yeasts and Molds | Bacteria |
| A | None | None (0 days storage) | 120,000 | 210,000 |
| A | None | None (14 days storage) | 25,100,000 | 8,500,000 |
| B | None | 120° F. for 5 minutes | 18,000,000 | 66,000,000 |
| C | 0.025 | ----do---- | 7,000 | 2,250 |
| D | 0.05 | ----do---- | 3 | 42 |
| E | None | 130° F. for 5 minutes | 590,000 | 2,250,000 |
| F | 0.025 | ----do---- | 325 | 2,150 |
| G | 0.05 | ----do---- | 4 | 8 |
| H | 0.10 | None (24 days storage) | 47,000,000 | 60,000,000 |

Taste tests on the cider treated with sodium sorbate and mild heat (Table I, Lots C, D, F and G) showed that they were still satisfactory at the completion of the storage test. The untreated controls (Lot A) spoiled in two days and both heated controls (Lots B and E) spoiled in five days. Cider containing 0.10% sodium sorbate (Lot H) developed large numbers of bacteria and other microorganisms and was considered spoiled in ten days.

Although the cider used in this example (1) was a good flavored product, with an initial bacterial count of 210,000 cells per milliliter, a two or three-fold increase in numbers of this magnitude usually results in spoilage of the cider. The significant reduction in number of viable microorganisms in Lots C, D, F and G illustrates the effectiveness of the process of this invention.

EXAMPLE 2

The cider used in this example came from a different commercial source than that of Example 1 and at the time of bottling had a count of 850 yeasts and molds per milliliter and 2,250 bacteria per milliliter. The control bottles (Lot K) for this storage test were an unheated group containing no sodium sorbate. Calculated amounts of a 25% aqueous sodium sorbate stock solution were added to aliquots of this cider to give concentrations of 0.025% and 0.030% by weight, respectively. Bottles of cider containing 0.025% sodium sorbate were arranged into three groups. One group (Lot L) was heated for five minutes at 120° F., another group (Lot M) for five minutes at 110° F., and the third (Lot N) for 15 minutes at 100° F.; bottles of cider containing 0.030% sodium sorbate (Lot O) were heated for five minutes at 100° F. Data on the microbial counts are presented in Table II.

*Table II*

EFFECT OF SODIUM SORBATE AND MILD HEAT TREATMENT UPON VIABLE MICROBIAL CONTENT OF APPLE CIDER [1] STORED AT ROOM TEMPERATURE FOR TWO MONTHS

| Lot No. | Treatment of Cider | | Microbial Count per ml. | |
|---|---|---|---|---|
| | Sodium Sorbate, percent | Heat Treatment | Yeasts and Molds | Bacteria |
| K | None | None (0 days storage) | 850 | 2,250 |
| K | None | None (9 days storage) | 460,000 | 495,000 |
| L | 0.025 | 120° F. for 5 minutes | 0 | 1 |
| M | 0.025 | 110° F. for 5 minutes | 0 | 1 |
| N | 0.025 | 100° F. for 15 minutes | 3 | 18 |
| O | 0.030 | 100° F. for 5 minutes | 0 | 3 |

[1] This apple cider obtained from a different source than that of Table I

As in Example 1, cider processed according to the present invention kept well during the two months storage at room temperature. Viable microorganisms were practically eliminated from the treated cider at the end of the storage period.

EXAMPLE 3

Fruit salad was prepared from approximately equal quantities of freshly prepared slices of orange, grapefruit and pineapple. The slices were sugared, stored overnight at 35° F. and the juice (44% of total weight) was recovered. Then 0.10% sodium sorbate was added to the juice. The juice was recombined with the slices of mixed fruits in pasteurized pint jars in the original ratio (44% juice, 56% slices by weight) and the jars sealed with pasteurized caps. There were three lots of five jars each: Lot A, untreated controls (no sorbate or heat); Lot B 0.1% sodium sorbate added, but no heat treatment; and Lot C, 0.10% sodium sorbate was added to the juice plus 120° F. for five minutes, then rapidly cooled to room temperature in cold, running water. All samples were stored at room temperature (70 to 75° F.). The untreated control (Lot A) contained 2100 yeasts and molds and 2400 bacteria per ml. at the start of the storage test. After two days the yeasts and molds count was 6,200,000 per ml. and the bacterial count was 15,000 per ml. All five jars showed gas formation and were spoiled. Lot B, containing sorbate but not heat treated, showed spoilage in thirteen days or less. Lot C, sorbate plus mild heat treatment, contained only two yeasts or molds and five bacterial per ml., after ninety days storage and showed no signs of spoilage. The retention of flavor and texture characteristics of freshly prepared fruit salad was very good, and condition of the samples indicated that they could have been stored satisfactorily for a much longer period of time.

EXAMPLE 4

Firm, ripe peaches were peeled by immersion in boiling water for one minute, a cold water rinse, and removal of the skins by hand. The flesh was sliced into sections about ⅜ inch wide and the slices were immediately immersed in a syrup prepared according to a commonly used formula: 2 lbs. sugar; 2 lbs. water; 1 oz. citric acid; and ½ oz. l-ascorbic acid. Twelve ounces of the slices were added to each pasteurized pint fruit jar and covered with four oz. of syrup. Sodium sorbate was added to all but the controls to give levels of 0.05% and 0.10% by weight, based upon total weight of jar contents. The jars were capped and heated by immersing in a water bath, rotating the jars during heating periods to aid in obtaining uniform heating throughout the contents of the jar. Levels of sodium sorbate added, time and temperature of the heat treatment, storage temperature, and observations regarding preservation during the storage period are summarized in Table III. The controls showed copious gas production due to abundant yeast growth and were rated as spoiled after two days at 73° F. and five days at 50° F. The sliced peaches processed according to this invention were in excellent condition, from the standpoint of flavor and texture at the end of the thirty day storage period.

Table III

EFFECT OF SODIUM SORBATE AND MILD HEAT TREATMENT UPON PRESERVATION OF SLICED PEACHES STORED ONE MONTH AT 50 AND 75° F.

| Process | | Storage Temperature, ° F. | Observations |
|---|---|---|---|
| Sodium Sorbate | Heat Treatment | | |
| None | None | 73 | Spoiled in 2 days. |
| 0.05% | 120° F. for 5 minutes | 73 | No significant changes in taste, color or texture. Viable microorganisms eliminated or negligible. |
| 0.10% | do | 73 | |
| 0.05% | 110° F. for 5 minutes | 73 | |
| 0.10% | do | 73 | |
| None | None | 50 | Spoiled in 5 days. |
| 0.05% | 120° F. for 5 minutes | 50 | No significant changes in taste, color or texture. Viable microorganisms eliminated or negligible. |
| 0.10% | do | 50 | |
| 0.05% | 110° F. for 10 minutes | 50 | |
| 0.10% | do | 50 | |
| 0.10% | 100° F. for 15 minutes | 50 | |

EXAMPLE 5

Another batch of peaches were similarly prepared as described in Example 4 with: no treatment, heat treatment only (120° F. for five minutes), 0.05% potassium sorbate only, and 0.05% potassium sorbate plus heat treatment (120° F. for five minutes). All samples spoiled in less than ten days except the latter sample which received the inventive treatment of preservative plus heat treatment. A sample of peaches prepared by the inventive process was examined after ninety days storage at 50° F. and was found to be excellent in all respects when compared with freshly prepared peaches.

EXAMPLE 6

Bananas were peeled and quartered lengthwise. These were placed in pasteurized glass jars and pineapple juice containing sodium sorbate to give 0.05% on the total weight—poured into the jars at a temperature of 130° F. The jars were immediately sealed, cooled and stored at 40° F. Pineapple juice was selected because its flavor blends with that of bananas. Unheated samples containing 0.05% sodium sorbate spoiled in two days. The jars receiving the inventive treatment were still in excellent condition after thirty days' storage.

EXAMPLE 7

Whole strawberries were processed according to the technique described in Example 6 using apple juice instead of pineapple juice as the liquid phase. The product was in excellent condition after 120 days' storage. The short exposure to the mild heat treatment as illustrated by Examples 5 and 6 are necessary in order to preserve the texture and other characteristics of these delicate fruits.

EXAMPLE 8

A crude pectase extract was prepared from ripe tomatoes according to the method of Hills and Mottern (J. Biol. Chem. 168: 651 (1947)). A portion of this extract was treated according to the process of this invention as follows: to 200 ml. of the tomato pectase extract was added 0.8 ml. of a 25% sodium sorbate solution, the mixture heated to 120° F. for 10 minutes, then cooled to room temperature. This solution showed no mold or bacterial growth after 7 days' storage at room temperature (70 to 75° F.). The untreated control showed fermentation after 1 day and mold growth after 3 days. The contamination of microorganisms made the untreated enzyme solution unsuitable for further use. On the other hand the extract preserved by mild heat and sorbate was suitable for use and retained nearly all of the original enzyme activity after 7 days.

EXAMPLE 9

Freshly pressed commercial apple juice (cider) was held at 40° F. for 24 hours to allow for settling of solids according to regular practice. The supernatant was drawn off and treated as follows:

| Sample | Treatment |
|---|---|
| 1 | None. |
| 2 | 120° F. for five minutes. |
| 3 | 15 milligrams—Vitamin C (l-ascorbic acid) per 100 mls. |
| 4 | 15 milligrams—Vitamin C (l-ascorbic acid) per 100 mls. plus 120° F. for 5 minutes. |

Storage of these samples at 73° F. showed the following results: Sample No. 1, with no treatment spoiled in 2 days, Sample No. 2 with heat treatment only spoiled in 5 days, and Sample No. 3 with vitamin C only spoiled in 3 days. However, Sample No. 4 which received the inventive treatment of low heat treatment (120° F. for 5 minutes) plus the preserving agent (1-ascorbic acid) was found to be satisfactory in all respects for 10 days.

Sorbic acid, sodium sorbate, or other sorbate salts may be used as the added agent, but the sodium salt is preferred because of its greater solubility in water, especially in water at the pH range of fruit juices. Levels of concentration of sodium sorbate in the range of 0.025 to 0.10% by weight in combination with heat treatment in the range of 100 to 130° F., 100 to 120° F. being the preferred range, for 5 to 15 minutes, were sufficient to prevent spoilage due to microbial activity during storage periods up to 90 days at ordinary room temperature. Within the limits disclosed the factors may be varied inversely to achieve approximately equivalent preservative action. For example, from Table II, the combination of 0.030% sodium sorbate and 100° F. for 5 minutes gave the same result as 0.025% sodium sorbate and 110° F. for 5 minutes as evaluated by microbial count after storage.

While the sequence of performing the combination of heating and adding the preserving agent is not considered critical, it is logical to apply the heat treatment last so that the containers need not be reopened. For products such as fruit salads it may be preferable to process the fruit batchwise, dispense under good sanitary conditions into clean containers, and cap for storage. It is preferable that the steps of the process follow one upon the other to minimize the microbial propagation which can occur until the inventive process is completed.

The process of this invention is especially valuable in preserving materials in the absence of refrigeration. However, applying the process to products which will be stored at temperatures below room temperature, for example at 50° F., is still advantageous because shelf storage life is greatly extended.

I claim:

1. A process for preventing growth of micro-organisms in a fresh fruit product selected from the group consisting of freshly expressed fruit juices, whole and subdivided fresh fruit substantially immersed in natural fruit juices, and whole and subdivided fresh fruit substantially immersed in aqueous diluted natural fruit juices at a temperature up to about 75° F., comprising mixing with said fresh fruit product an amount of a preserving agent selected from the group consisting of a l-ascorbic acid, sodium sorbate, potassium sorbate and sorbic acid to provide a concentration in the range of 0.015 to 0.10% by weight of said agent in the liquid medium, packaging the mixture in a clean, closed container, heating the packaged mixture to a temperature in the range of about from 100 to 130° F. for a time interval of about from 5 to 15 minutes, and storing the resulting product at a temperature up to about 75° F.

2. The process of claim 1 in which the fresh fruit product is selected from the group consisting of apple cider, fruit salad and sliced peaches.

3. The process of claim 1 in which the fresh fruit product is apple cider.

4. The process of claim 1 in which the fresh fruit product is fruit salad.

5. The process of claim 1 in which the fresh fruit product is sliced peaches.

6. A process for preventing growth of micro-organisms in a fresh fruit selected from the group consisting of bananas and strawberries substantially immersed in natural fruit juices at a temperature up to about 75° F., comprising placing a fresh fruit selected from the group consisting of bananas and strawberries into a pasteurized container, adding to said fresh fruit in the container a fruit juice at a temperature of about 130° F. and containing sufficient sodium sorbate to provide a concentration of about 0.05% by weight of the contents of said pasteurized container, sealing said container, and storing said sealed container at a temperature up to about 75° F.

7. The process of claim 6 in which the fresh fruit is bananas.

8. The process of claim 6 in which the fresh fruit is strawberries.

9. A process for preventing growth of micro-organisms in fresh fruit juice comprising mixing with said fresh fruit juice an amount of l-ascorbic acid to provide a concentration of l-ascorbic acid of about 0.015% by weight, heating the mixture to a temperature in the range of about from 100 to 120° F. for a time interval of about 5 to 15 minutes, and storing the resulting product at a temperature up to about 75° F.

10. The process of claim 9 in which the fruit juice is apple cider.

References Cited in the file of this patent

UNITED STATES PATENTS

| | | |
|---|---|---|
| 1,943,633 | Sperti | Jan. 16, 1934 |
| 2,354,014 | Haines | July 18, 1944 |
| 2,379,294 | Gooding | June 26, 1945 |
| 2,475,793 | Lesuk | July 12, 1949 |
| 2,586,274 | Tolenaar | Feb. 19, 1952 |
| 2,817,589 | Walrod | Dec. 24, 1957 |

FOREIGN PATENTS

| | | |
|---|---|---|
| 529,728 | Great Britain | Nov. 27, 1940 |

OTHER REFERENCES

The Fruit Products Journal and American Food Manufacturer, September 1946, vol. 26, No. 1, pp. 11–14, 29; article by Esselen et al. entitled "The Fortification of Fruit Juices with Ascorbic Acid."

Food Industries, October 1950, pp. 40 and 41, article entitled "Canning with Antibiotics—Pro and Con," by Roy E. Morse.

Food Engineering, August 1953, pp. 127, 151, article entitled "New Fungicide-Sorbic Acid."

United States Department of Agriculture publication Number ARS–73–5, entitled "The Preparation and Preservation of Apple Cider on the Farm," 1955.

Food Technology, December 1957, pp. 667, 668, 669, article by Weaver et al. entitled "Preservation of Apple Cider with Sodium Sorbate."